United States Patent
Moy et al.

(10) Patent No.: US 10,745,190 B2
(45) Date of Patent: Aug. 18, 2020

(54) TRANSPORTABLE HARP RACK FOR PANELS

(71) Applicant: G James Australia Pty Ltd, Eagle Farm (AU)

(72) Inventors: Bruce Moy, Eagle Farm (AU); Georg Nierfeld, Chandler (AU); Glenn McGill, Eagle Farm (AU)

(73) Assignee: G JAMES AUSTRALIA PTY LTD, Eagle Farm (AU)

( * ) Notice: Subject to any disclaimer, the term of this patent is extended or adjusted under 35 U.S.C. 154(b) by 0 days.

(21) Appl. No.: 16/683,473

(22) Filed: Nov. 14, 2019

(65) Prior Publication Data
US 2020/0223619 A1    Jul. 16, 2020

(30) Foreign Application Priority Data
Jan. 16, 2019   (AU) ................................ 2019900164

(51) Int. Cl.
 *B65D 85/48* (2006.01)
 *B65G 49/06* (2006.01)
(52) U.S. Cl.
 CPC ........... *B65D 85/48* (2013.01); *B65G 49/062* (2013.01)
(58) Field of Classification Search
 CPC ............ B65D 85/48; B65D 2519/0882; B65G 49/062
 USPC .......... 211/41.14, 41.1, 41.15; 206/454, 448, 206/449, 451, 453, 386
 See application file for complete search history.

(56) References Cited

U.S. PATENT DOCUMENTS

| | | | | |
|---|---|---|---|---|
| 2,953,253 A | * | 9/1960 | Henderson | B65D 67/02 211/41.14 |
| 3,147,860 A | * | 9/1964 | Kean, Sr. | B65D 85/48 206/448 |
| 3,938,660 A | * | 2/1976 | Moehring | B65D 19/08 206/451 |
| 3,961,709 A | * | 6/1976 | Rowley | B65D 85/48 206/448 |
| 3,963,122 A | * | 6/1976 | Pater | B65D 81/052 206/448 |
| 4,320,836 A | * | 3/1982 | Brown | B65D 85/48 206/451 |
| 5,378,093 A | * | 1/1995 | Schroeder | B61D 45/006 211/41.15 |

(Continued)

FOREIGN PATENT DOCUMENTS

EP    3 331 777 B1    6/2018

OTHER PUBLICATIONS

Extended European Search Report dated Apr. 7, 2020, issued by the European Patent Office in corresponding application EP 19275113.9.

*Primary Examiner* — Jonathan Liu
*Assistant Examiner* — Devin K Barnett
(74) *Attorney, Agent, or Firm* — Stein IP, LLC (57) ABSTRACT

A transportable rack for transporting multiple glass panels with securing assemblies having a number of resilient blocks therein, at least partially defining a receiving gap, and a shaped spigot mounted relative to a drive mechanism to selectively move the shaped spigot relative to the resilient block between a rest condition in which a panel can be inserted into the receiving gap and to cause deformation of the resilient block into an expanded clamping condition in which a portion of the resilient block is moved to clamp the panel within the receiving gap.

18 Claims, 9 Drawing Sheets

(56) References Cited

U.S. PATENT DOCUMENTS

| | | | | | |
|---|---|---|---|---|---|
| 5,582,495 | A * | 12/1996 | Schroeder | B60P 7/10 | 211/41.15 |
| 5,641,076 | A * | 6/1997 | Englund | B65D 85/48 | 206/454 |
| 5,906,282 | A * | 5/1999 | Aldrich | B65G 49/062 | 206/454 |
| 5,960,960 | A * | 10/1999 | Yamamoto | H01L 21/67326 | 206/454 |
| 6,102,206 | A * | 8/2000 | Pride | B65D 85/48 | 206/454 |
| 6,186,344 | B1 * | 2/2001 | Park | H01L 21/6734 | 211/41.1 |
| 6,588,605 | B1 * | 7/2003 | Volkert | B65D 88/005 | 206/449 |
| 7,249,682 | B2 * | 7/2007 | Lacatus | B65D 25/101 | 211/41.14 |
| 8,875,909 | B2 * | 11/2014 | Gerkensmeier | B65D 19/44 | 211/175 |
| 2003/0113192 | A1 * | 6/2003 | Ransom | B25J 9/0096 | 414/281 |
| 2003/0141213 | A1 * | 7/2003 | Bartholomew | B65D 85/48 | 206/454 |
| 2004/0168946 | A1 * | 9/2004 | Angeletti | B65D 19/44 | 206/448 |
| 2004/0238465 | A1 * | 12/2004 | Mercure | A47B 81/00 | 211/41.14 |
| 2004/0245195 | A1 * | 12/2004 | Pride | B65D 25/101 | 211/41.14 |
| 2005/0067360 | A1 * | 3/2005 | Darvial | B65D 85/48 | 211/41.14 |
| 2006/0043032 | A1 * | 3/2006 | McHugh | B65D 85/48 | 211/41.14 |
| 2006/0196838 | A1 * | 9/2006 | Mercure | A47F 7/0042 | 211/41.1 |
| 2007/0045204 | A1 * | 3/2007 | Huard | B65D 85/48 | 211/41.14 |
| 2007/0108140 | A1 * | 5/2007 | Wu | B29D 11/00 | 211/41.1 |
| 2007/0163969 | A1 | 7/2007 | Huszczo et al. | | 211/45 |
| 2007/0221592 | A1 * | 9/2007 | Strauss | B65G 49/062 | 211/41.15 |
| 2009/0250416 | A1 * | 10/2009 | Chookang | B65D 85/48 | 211/41.14 |
| 2010/0288664 | A1 * | 11/2010 | Glover | B65D 19/44 | 206/386 |
| 2012/0000866 | A1 * | 1/2012 | Huszczo | B65D 19/44 | 211/41.14 |
| 2012/0031787 | A1 * | 2/2012 | McColl | B65D 19/18 | 206/320 |
| 2012/0175323 | A1 * | 7/2012 | Ceron Garcia | B65D 85/30 | 211/41.1 |
| 2013/0057135 | A1 * | 3/2013 | Bradford | B65D 85/68 | 312/321 |
| 2013/0233811 | A1 * | 9/2013 | Glover | B65D 19/12 | 211/41.14 |
| 2014/0026622 | A1 * | 1/2014 | Wang | C03B 29/16 | 65/111 |
| 2014/0069836 | A1 * | 3/2014 | Mercure | B65D 85/48 | 206/454 |
| 2015/0041435 | A1 * | 2/2015 | Gu | C03B 23/023 | 216/97 |
| 2015/0166268 | A1 * | 6/2015 | McHugh | B65D 49/062 | 211/41.14 |
| 2015/0368029 | A1 * | 12/2015 | Kronsteiner | B65G 49/062 | 211/85.8 |
| 2015/0375931 | A1 * | 12/2015 | Bublitz | B65D 19/06 | 220/544 |
| 2018/0303236 | A1 * | 10/2018 | Thompson | B65D 19/44 | |
| 2019/0218022 | A1 * | 7/2019 | Mader | B65D 85/48 | |

* cited by examiner

Figure 17  Figure 18 ional Pat-

TRANSPORTABLE HARP RACK FOR PANELS

INCORPORATION BY REFERENCE

This application is based upon and claims the benefit of priority from the corresponding Australian Provisional Patent Application No. 2019900164 filed on Jan. 16, 2019, the entire contents of which are Incorporated herein by reference.

TECHNICAL FIELD

The present invention relates generally to the field of transportable racks for panels and particularly to a transportable rack for transporting multiple glass panels.

BACKGROUND ART

The transport of a commercial number of glass sheets or panels has one primary concern, namely keeping the glass intact until it is delivered and/or Installed.

It is known in the prior art that sheet glass is normally tilted during loading, unloading and transportation of the glass. If stacked vertically, perpendicular to the ground, such glass can easily can tip and fall over, giving the same effect as a row of dominos knocking each other over. Therefore, glass products tend to fall out during loading or unloading. This obviously leads to the problem of breakage.

The deficiencies in the typical prior art shipping arrangements are evident in that the vehicle glass industry allows for 3 percent breakage as a standard during the shipping of glass products.

Prior art devices to hold glass in an inclined position have succeeded in minimising breakage but improvement is still possible. For example, McDowell U.S. Pat. No. 5,105,946 discloses a container for shipping sheets of glass. A front portion 16 including two end walls 17 are 18, a top panel 20 and end extension panels 22 and 23 is Illustrated in FIG. 2 of that patent. The container disclosed in McDowell requires the use of a paperboard and frame box which provides most of the support for the glass products. The box is secured to a large wooden pallet (12). The paperboard, frame and pallet can deteriorate from moisture and use. McDowell further discloses the disadvantage of shipping the glass vertically. McDowell teaches that the glass can be set in an inclined position during the unloading of the glass. Two wedge members, 42 and 43, comprised of separate, corrugate material, hold the glass vertically during transport. The wedges 42 and 43 must be removed and the glass products repositioned in order to tilt the glass backward toward a cradle 52 during unloading to avoid the problem of glass falling forward with potential breakage of the glass. Prior art devices such as McDowell, when put in use, typically required the user to insert a block of wood under the front of the pallet to prevent glass from falling forward and breaking during loading and unloading. The container disclosed in McDowell requires the use of a paperboard and frame box which cannot be reduced in size. If the McDowell container is Intended to be reused, the container must be returned empty but in its original size.

Devices such as these or other assemblies that maintain the glass panels in an inclined state are typically used for the transport of a relatively smaller number of glass panels or sheets, normally fewer than ten sheets not only for the minimisation of breakage but also for weight reasons, as glass can be particularly heavy.

It would therefore be an improvement in the art to provide a rack that allows transport of a large number of glass panels, preferably in a substantially vertical orientation which will minimise space used. Further, it would be advantageous if the rack could transport the glass panels in a spaced apart configuration to minimise damage to the panels that may occur without breaking them such as scuffing or scratching.

It will be clearly understood that, if a prior art publication is referred to herein, this reference does not constitute an admission that the publication forms part of the common general knowledge in the art in Australia or in any other country.

SUMMARY OF INVENTION

The present invention is directed to a transportable harp rack for panels, which may at least partially overcome at least one of the abovementioned disadvantages or provide the consumer with a useful or commercial choice.

With the foregoing in view, the present invention in one form, resides broadly in a transportable harp rack for a plurality of panels, the harp rack including:
 a) A frame including at least one base member and at least a pair of spaced apart upright members extending at an angle to the at least one base member;
 b) At least two securing assemblies provided relative to the frame, at least one securing assembly provided relative to the at least a pair of upright members and at least one other securing assembly, each securing assembly including:
  i. A plurality of panel tongues spaced from one another by a respective receiving gap configured to receive a portion of a panel therein;
  ii. At least one of the panel tongues provided with a resilient block therein, at least partially defining the receiving gap, the resilient block including at least one opening thereinto;
  iii. A shaped spigot mounted relative to a drive mechanism to selectively move the shaped spigot relative to the at least one opening in the resilient block between a rest condition in which a panel can be inserted into the receiving gap and to cause deformation of the resilient block into an expanded clamping condition in which a portion of the resilient block is moved to clamp the panel within the receiving gap.

The transportable harp rack of the present invention preferably allows the storage and transport of a plurality of panels safely and easily. Typically, the harp rack of the present Invention will receive and hold each of the panels in a spaced apart configuration, preferably substantially parallel to one another. The harp rack will typically hold the panels in a substantially vertical configuration.

The harp rack of the present invention is particularly configured to receive and hold glass panels but due to the configuration of the components used, may be used to receive and hold any type of panels which are substantially planar.

The harp rack of the present Invention is preferably generally rectangular in shape and configuration.

The harp rack of the present invention includes a frame having at least one base member and at least a pair of spaced apart upright members extending at an angle to the at least one base member. Typically, the base of the harp rack will be formed from a number of frame members, typically at least four frame members which together define a substantially rectangular perimeter for a rectangular opening. Typically, there will be at least two side rail members and at least two end members located substantially perpendicularly relative to one another to form the substantially rectangular perimeter. One or more transverse members may be provided between the side rail members for increased stability.

A base assembly is typically provided relative to the rectangular opening of the base frame. Preferably, the base assembly is provided such that each of the panels can at least abut the base assembly. In a particularly preferred embodiment, the base assembly include one or more members, typically a single member with a number of elongate slots formed thereinto with each elongate slot configured to receive a lower edge of a panel in use. When viewed from the end, the base assembly will typically have a square wave pattern with each of the slots separated from an adjacent slot by raised portion over its length. In a preferred configuration, the base assembly will typically form part of a harp assembly in order to separate the panels and maintain the panels in a spaced apart configuration. Each panel tongue will typically be provided relative to a raised portion adjacent to an elongate slot with the receiving gap between respective panel tongues being aligned with a slot opening in the base assembly.

Preferably, each slot will be provided with a base wall and a pair of spaced apart, substantially parallel side walls. The base wall of each slot will typically abut an edge of a panel placed thereinto, typically over the length of the panel.

The harp rack of the present invention will typically have at least one upright member extending from a respective corner of the base frame. In the preferred configuration where the base frame is rectangular, four upright members will be provided, one extending upward from each corner of the preferred base frame. Typically, the uprights will extend substantially perpendicularly to the base frame. The upright members may have any shape or configuration but preferably, will be substantially rectangular in cross-sectional shape. It is preferred that the upright members are hollow in order to reduce weight. Typically, each of the uprights is located outside the harp assembly or alternatively, the harp assembly is preferably provided within the perimeter defined by the base frame and the upright.

Typically, the upper ends of the uprights are connected relative to one another by a number of upper members, typically provided substantially parallel to each of the respective base frame members and coplanar therewith but spaced apart therefrom. The provision of the upper members will typically connect the upper ends of the respective uprights in order to form an open, a three-dimensional rectangular frame for the harp rack. Although the upper members may have any shape and configuration, the upper members will preferably each be substantially rectangular in cross-sectional shape. It is preferred that the upper members are hollow in order to reduce weight.

The preferred frame of the present invention will normally be provided with one or more engagement assemblies to allow the harp rack to be lifted using a lifting apparatus. The fully loaded harp rack may be quite heavy, particularly when loaded with a number of glass panels and a lifting apparatus may be required to move the harp rack. In a preferred configuration, one or more lifting rings will typically be provided attached to any one or more of the frame members to allow the harp rack to be lifted using a crane or similar lifting equipment. In some configurations, small harp racks may be provided with openings to allow the harp rack to be lifted using a forklift or similar.

As mentioned above, it is preferred that the harp assembly used to receive the plurality of panels and maintain them in a spaced apart configuration is located relative to, and preferably concentrically inside the preferred substantially rectangular three-dimensional frame. This will assist with maintaining the edge of the plurality of panels inside the frame members which will minimise the chance that the panels are exposed to any damage which may affect more than just the edge of the panel.

The harp system will preferably include a lower harp assembly provided relative to the base of the frame (which in the preferred configuration includes the base assembly Including a number of elongate slots formed thereinto) and at least one other harp assembly to assist with maintaining the separation of the panels when loaded into the harp rack. In a particularly preferred embodiment, a diagonally extending harp assembly will preferably be provided.

It is preferred that the diagonally extending harp assembly will preferably be or include a series of spaced apart members, preferably wires or rods or the like. The spaced apart members will normally be manufactured of metal but may be any material. Typically, the spaced apart members are provided extending substantially parallel to one another but spaced apart typically to correspond to the width of the panels to be received therebetween. The spaced apart members are typically mounted relative to the frame of the harp rack. Typically, the spaced apart members in the diagonally extending harp assembly will be substantially coplanar with the raised portions between the elongate slots provided in the base assembly. Normally, a lower end of each of the elongate members will be mounted relative to the raised portions between the elongate slots provided in the base assembly and will be spaced apart over the length, with an opposite end of each of the spaced apart members being mounted relative to one of the upper members. Typically, a lower end of spaced apart members is provided spaced from the end base member and the spaced apart members extend at an angle upwardly from the base assembly toward one of the upper end members.

The lower harp assembly is typically mounted relative to the base frame above the level of the base members and any transverse members provided. The panels may be loaded into the lower harp assembly from any direction substantially parallel to the slot openings and the elongate members of the diagonally extending harp assembly. In one preferred form, the lower harp assembly is a unitary base assembly with slots formed thereinto.

In an alternative configuration, the base assembly may be formed from a number of spaced apart members rather than a unitary base assembly with slots formed thereinto.

As mentioned above, the elongate members of the diagonally extending harp assembly preferably extend from the base assembly, between ⅓ to ½ of the length along the base assembly upwardly to the upper end frame member at an opposite end of the harp rack. Preferably, an upper end of each of the elongate members is mounted relative to an inside edge of the upper end frame member.

A secondary, preferably vertical harp assembly is preferably provided relative to one end of the frame. The secondary harp assembly will preferably be or include a series of spaced apart members, preferably wires or rods or the like. The spaced apart members will normally be manufactured of metal but may be any material. Typically, the spaced apart members are provided extending substantially parallel to one another but spaced apart typically to correspond to the width of the panels to be received therebetween. The spaced apart members are typically mounted relative to the frame of the harp rack. Typically, the spaced apart members in the secondary harp assembly will be substantially coplanar with the raised portions between the elongate slots provided in the base assembly. Normally, a lower end of each of the elongate members will be mounted relative to the raised portions between the elongate slots provided in the base assembly and will be spaced apart over the length, with an opposite end of each of the spaced apart members being mounted relative to one of the upper members. Typically, a lower end of spaced apart members is provided above the end base frame member and the spaced apart members extend upwardly from the base assembly toward the upper end frame member at the same end of the frame.

The harp rack of the present invention includes at least two securing assemblies provided relative to the frame at least one securing assembly provided relative to the at least a pair of upright members and at least one other securing assembly.

Preferably, at least two securing assemblies will be provided, one securing assembly provided relative to the base of the harp rack and a second securing assembly provided relative to one end of the frame such that the securing assemblies will secure each of the panels at a lower edge and one of the end edges.

Typically, the second securing assembly will be oriented the inwardly towards the opposite end of the frame and in a preferred embodiment, is preferably mounted on a cross-member extending between the uprights provided at one end of the frame.

Each of the securing assemblies we has the same configuration but the actuator/drive mechanism may be different for the different securing assemblies. In particular, it is preferred that any lever or actuator of the drive member be located within the perimeter of the frame at all times rather than extending outside the perimeter of the frame.

Each of the securing assemblies includes a plurality of panel tongues spaced from one another by a respective receiving gap configured to receive a portion of a panel therein. Each of the panel tongues are preferably substantially coplanar with the raised portions of the base assembly and/or the spaced apart members of the diagonal extending harp assembly.

Each panel tongue is preferably generally rectangular in shape with a pair of parallel side faces, each defining a portion of the receiving gap with an adjacent panel tongue. Typically, each of the parallel side faces is configured as an outer perimeter portion with a central opening. The opening may be any shape however a rectangular opening is preferred. The central opening will typically extend to the side face on both sides of the panel tongue.

Each panel tongue will typically Include at least one slot or opening which is located coaxial with the tongue and approximately centrally across the width of the tongue, in communication with the central opening and particularly, in communication with the resilient block provided in relation to each of the panel tongues.

In a particularly preferred configuration, each panel tongue will be provided with a resilient block located at least partially in in communication with the central opening. Preferably, the resilient block will have the same width as the panel tongue in the rest condition. The resilient block is typically substantially rectangular in order to correspond to the external shape of the central opening although any shape could be used.

Each resilient block will preferably include a bore into or through the resilient block to allow the spigot to move at least into the resilient block to move the resilient block into the expanded clamping condition. Typically, the bore in the resilient block will be aligned with the slot or opening in the panel tongue.

The bore may have any shape. Typically, the internal wall(s) of the bore will abut the shaped spigot during movement of the shaped spigot to force the resilient block into the expanded clamping condition. In the rest condition, portions of the block will typically be substantially coplanar with the side surfaces of the panel tongue in order to define at least partially, the receiving gap.

As mentioned above, typically the panel tongue will define a portion of the receiving gap on both sides of the panel tongue (except for the two outermost panel tongues, one at either end) and the resilient block will define a portion of the receiving gap. Typically, when the resilient block is moved into the expanded clamping condition, a portion of the resilient block extend beyond the side face of the panel tongue and into the receiving gap. Typically, the expansion of the resilient block forced by the spigot will be approximately even on both sides of each of the panel tongues.

The resilient block may be formed of any material but will typically be formed of a foamed material. The material typically be chosen to minimise slippage with the surface of the panel in the panel is glass or similar but also to prevent or minimise any marking of the surface. The resilient block will generally be made of a high friction material in order to securely grip the panels when the expanded clamping condition. The resilient block will typically expand evenly and abut a portion of the panel in order to spread the load over a portion of the panel when in the expanded clamping condition.

The securing assemblies each include a shaped spigot mounted relative to each of the panel tongues and to a drive mechanism such that the drive mechanism can be utilised to selectively move the shaped spigot relative to the resilient block in at least one, and typically concurrently in all of the panel tongues in order to move the resilient blocks in each of the panel tongues into the expanded clamping condition. The movement of the drive mechanism in the opposite direction will typically move the shaped spigot relative to the resilient block to allow the resilient block to resume the rest condition in which a panel can be inserted into the receiving gap and removed from the receiving gap.

The spigot will typically be shaped. Although any shape may be utilised, it is preferred that the spigot be tapered such that movement of the spigot can be used to expand the resilient block and retraction of the spigot can be used to allow the resilient block to resume the rest condition. Generally, the spigot will be tapered in more than one direction. In a particularly preferred embodiment, the spigot will be wedge shaped preferably having one or more angled or arcuate tapered surfaces.

Each spigot will typically be associated with a mounting pin or structure to mount each respective spigot for movement relative to the resilient block of a panel tongue. As mentioned above, typically a spigot will be provided for each of the panel tongues and the drive mechanism can be utilised to move all of the spigots concurrently to move the resilient block into the expanded clamping condition and retract the spigots to allow the resilient block to resume the rest condition. Generally, the mounting pin or structure will be configured as a flattened tongue or pin which extends from an outer side of the spigot. Typically, the mounting pin or structure will be located relative to a respective frame member in order to be more easily accessible by a linking member to the drive mechanism.

During movement, the spigot may be removed entirely from the or in the resilient block but preferably, at least a portion of the spigot may be located at least partially within the bore in the resilient block at all times and the spigot simply moved relative to the bore in the resilient block to move the block between the rest condition and the enlarged condition. The spigot may move in any direction.

As mentioned above, movement of the spigot relative to the bore in the resilient block preferably moves the resilient block from the rest condition where the block or portions of the block simply define a part of the receiving gap between adjacent panel tongues to an expanded condition in which at least a part of the resilient block extends beyond the side face of the panel tongue and into the receiving gap to abut and hold a panel if located in the receiving gap. With a pair of panel tongues defining a receiving gap with a resilient block in each, this will allow a panel located in the receiving gap to be held on both sides. Even if only one panel tongue is provided with a resilient block, a panel can still be secured in place in the receiving gap by the expansion of the resilient block clamping the panel against an adjacent panel tongue.

Typically, when the spigot is fully within the resilient block, the resilient block will be in the expanded condition.

A drive mechanism is preferably provided to move the spigot and typically all of the spigots located in a particular securing assembly at the same time between the rest condition and the expanded condition. Typically, the drive will be a reciprocating drive which moves the spigots from the rest condition to the expanded condition and then back to the rest condition.

Any drive mechanism may be used but it is preferred that the drive mechanism Include at least one lever or handle, manual movement of which will cause movement of the spigots. Typically, the lever or handle will move in a first direction to move from the rest condition to the expanded condition and in an opposite direction to move from the expanded condition to the rest condition. The lever or handle will typically rotate reciprocally.

Any drive mechanism Including any lever is preferably mounted relative to the harp rack such that movement of the lever or handle does not move the lever outside the periphery of the harp rack (although the handle or lever may be located outside the frame of the harp rack).

In an alternative configuration, and electric drive or similar may be provided to move the spigots.

As mentioned above, a plurality of spigots will typically be provided mounted relative to a single mounting drive bar or assembly to allow all of the spigots to be moved concurrently.

Mechanical deformation of the resilient block between the rest condition and the expanded condition is preferred because it is more reliable and less complex than other mechanisms such as pneumatic expansion of the resilient block for example.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

According to a particularly preferred embodiment of the present Invention, a transportable harp rack 10 for glass panels (not shown) is provided.

Figure 1:
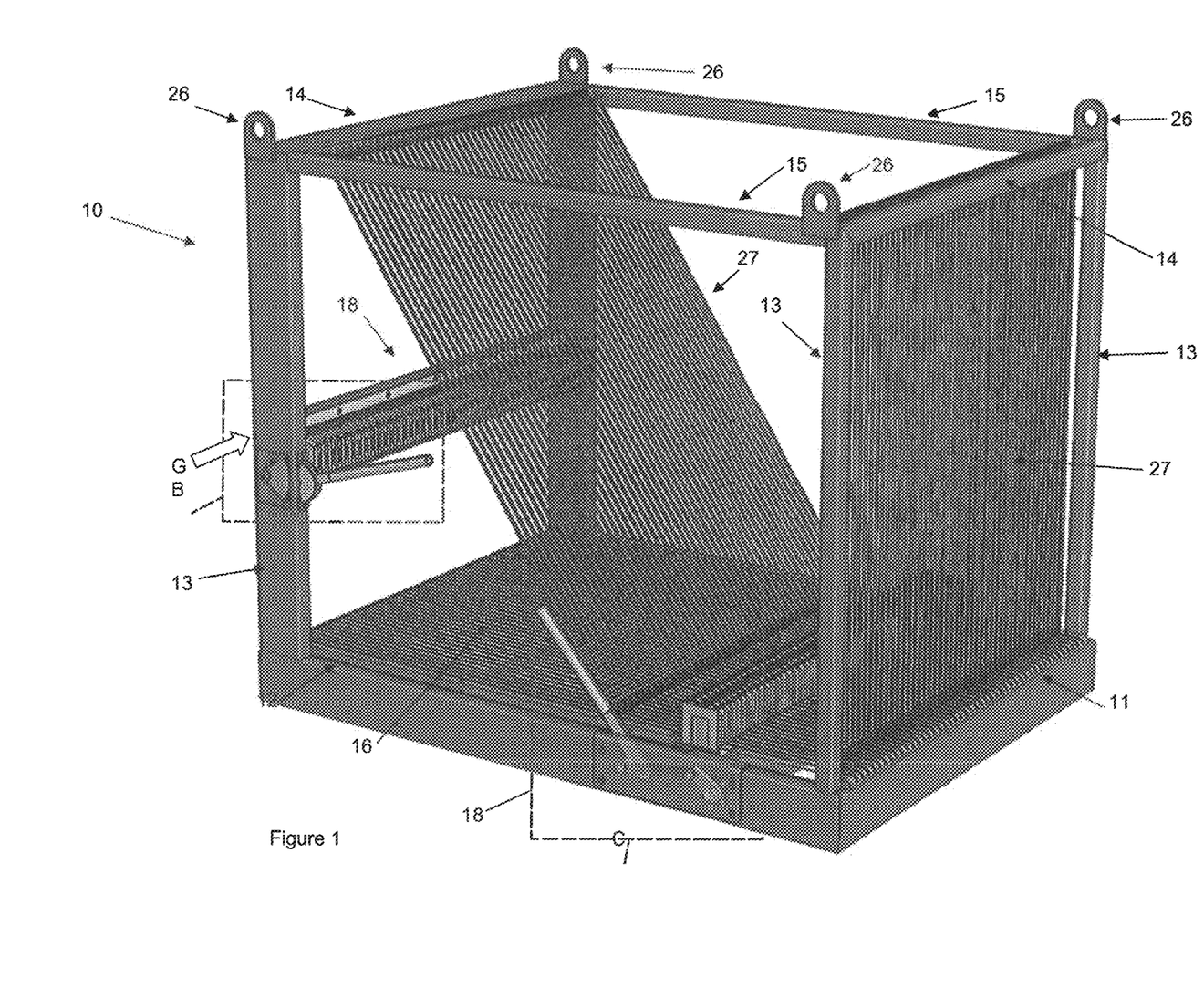
FIG. 1 is an isometric view of a transportable harp rack according to a preferred embodiment of the present invention.
Figure 2:
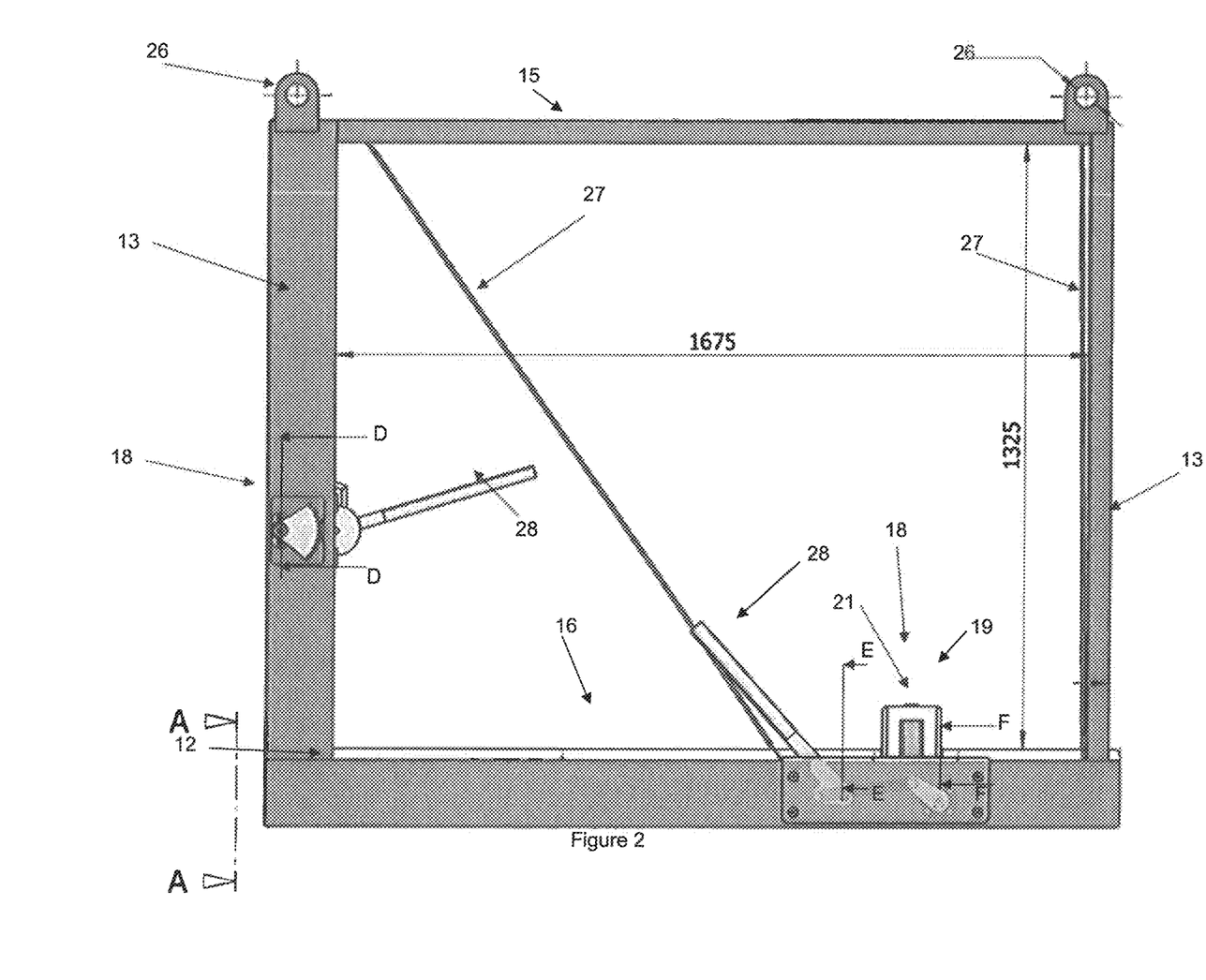
FIG. 2 is a side view of the transportable harp rack illustrated in FIG. 1.
Figures 3, 4:
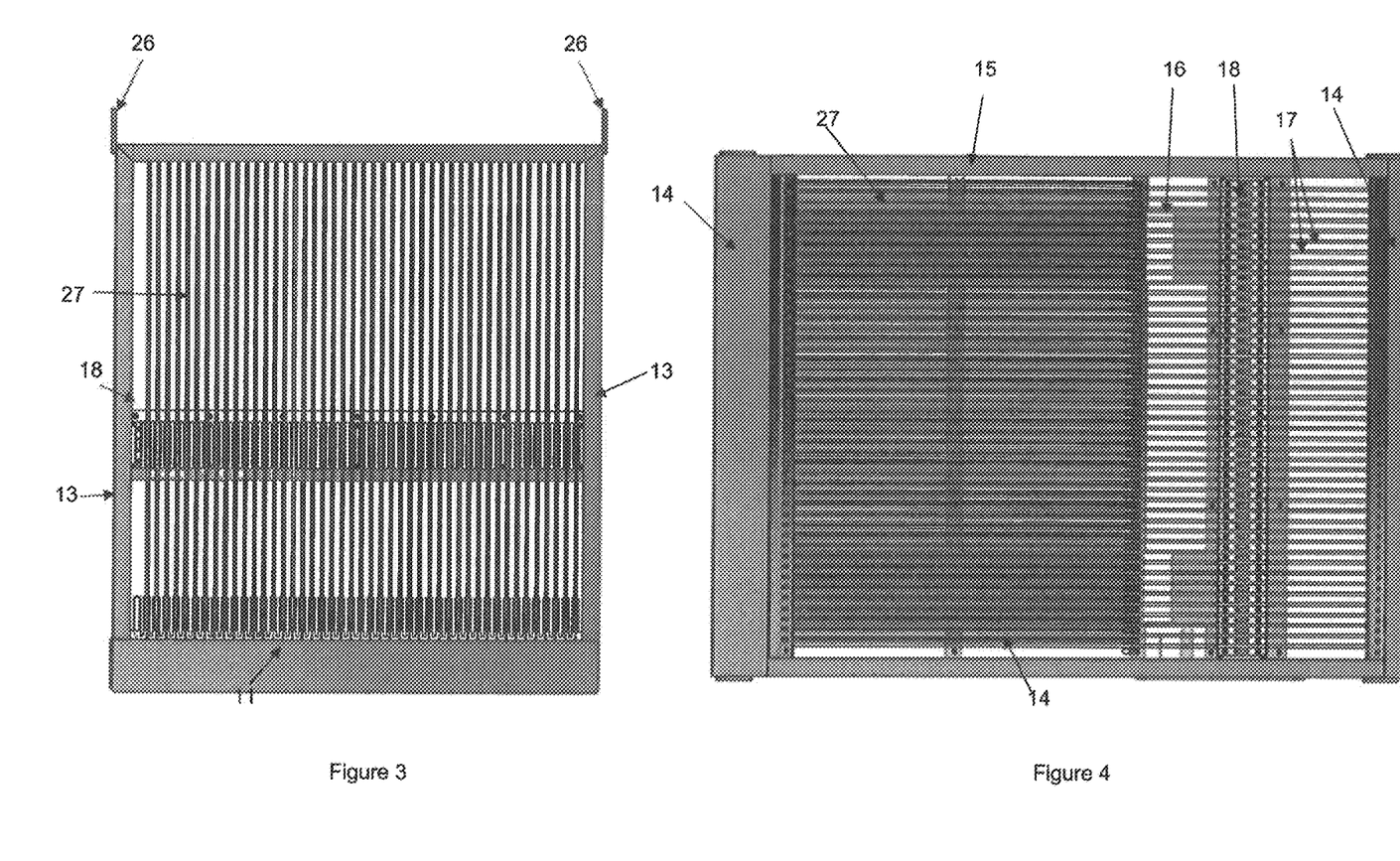
FIG. 3 is an end view of the transportable harp rack Illustrated in FIG. 1.
FIG. 4 is a top view of the transportable harp rack illustrated in FIG. 1.
Figure 5:
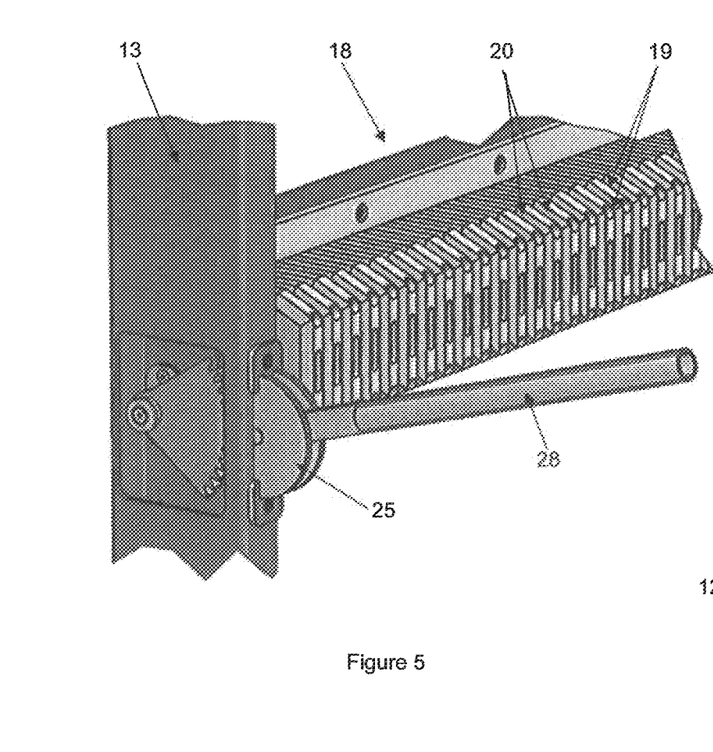
FIG. 5 is a detailed isometric view of the portion identified in FIG. 1 using reference letter B.

The transportable harp rack 10 illustrated in the Figures includes a frame including at a number of base frame members, (two end base frame members 11, two side base frame members 12) and a number of spaced apart upright frame members 13 extending at an angle to the base frame members and a number of upper frame members, (two end upper frame members 14, two side upper frame members 15) together defining an open, generally rectangular, three-dimensional frame. A floor member 16 with a plurality of elongate slots 17 to each receive an edge of a panel therein is provided relative to the base frame members.

A pair of securing assemblies 18 are provided relative to the frame, one securing assembly provided relative to a pair of upright frame members 13 and a second securing assembly provided relative to the floor member 16.

Each securing assembly 18 Includes a plurality of panel tongues 19 spaced from one another by a respective receiving gap 20 configured to receive a portion of a panel therein.

The panel tongues 19 are each provided with a resilient block 21 therein which at least partially defines the receiving gap 20.

Figure 14:
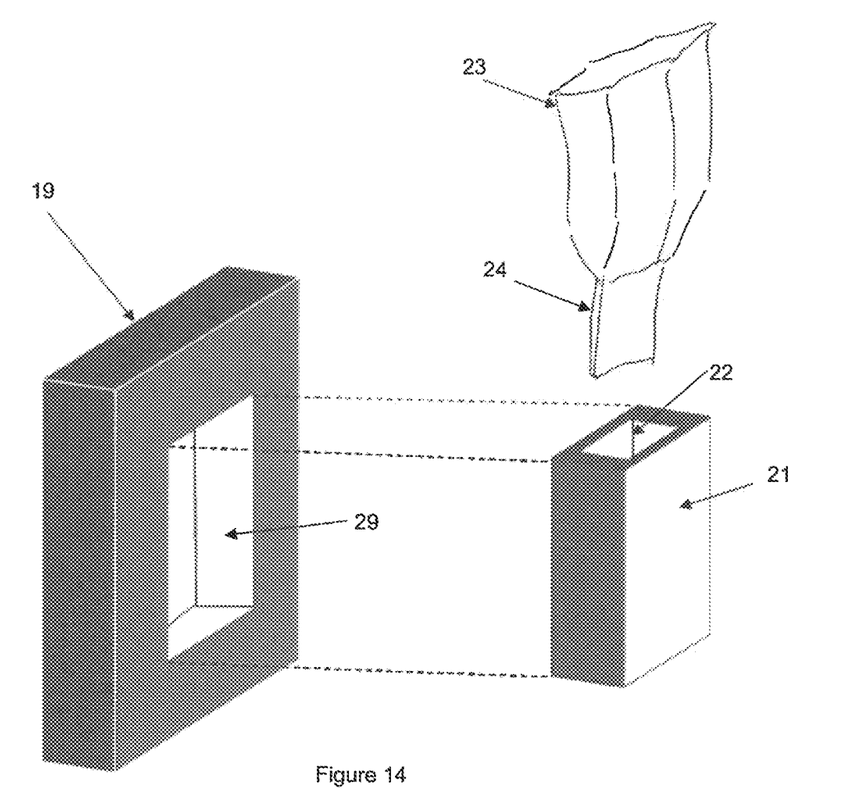
FIG. 14 is a schematic exploded isometric view of a single securing assembly according to a preferred embodiment of the present invention.
Figure 15:
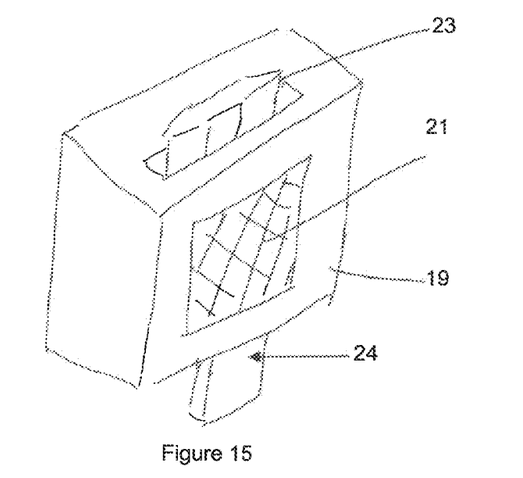
FIG. 15 a schematic isometric view of the securing assembly illustrated in FIG. 14 assembled.
Figure 16:
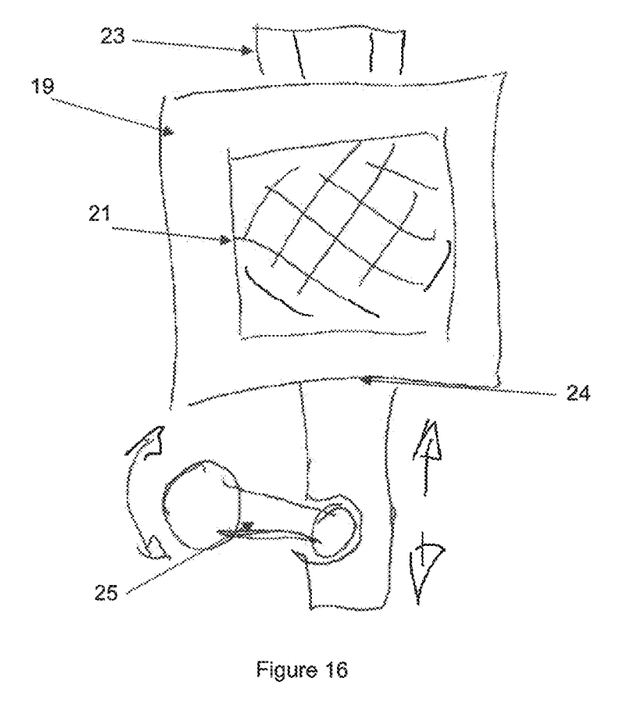
FIG. 16 is a schematic side view a single securing assembly with drive according to a preferred embodiment of the present invention.
Figure 17:
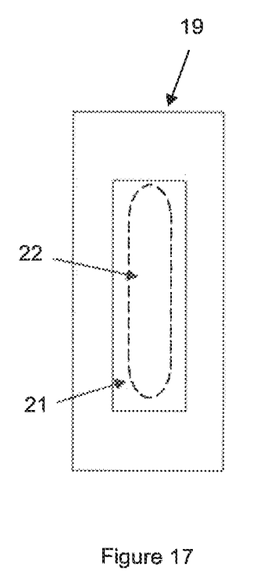
FIG. 17 is a schematic view from above of a single securing assembly in the rest condition.
Figure 18:
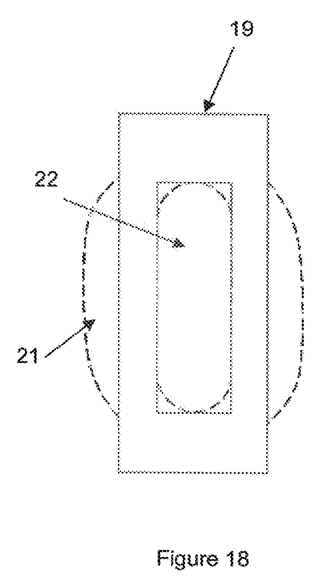
FIG. 18 is a schematic view from above of a single securing assembly in the expanded condition.

As best illustrated in FIGS. 14 and 15, each resilient block 21 includes a bore 22 thereinto with a shaped spigot 23 mounted relative to a drive mechanism 25 to selectively move the shaped spigot 23 relative to the bore 22 in the resilient block 21 between a rest condition illustrated in FIG. 17 in which a panel can be inserted into the receiving gap 20 and to cause deformation of the resilient block 21 into an expanded clamping condition shown in FIG. 18 in which a portion of the resilient block 21 is moved to extend beyond the side surfaces of the panel tongue 19 to abut a panel in the receiving gap 20 to clamp the panel within the receiving gap 20.

Typically, the harp rack 10 will receive and hold each of the panels in a spaced apart configuration, substantially parallel to one another. Although the panels are not illustrated, the harp rack 10 will typically hold the panels in a substantially vertical configuration.

Figure 7:
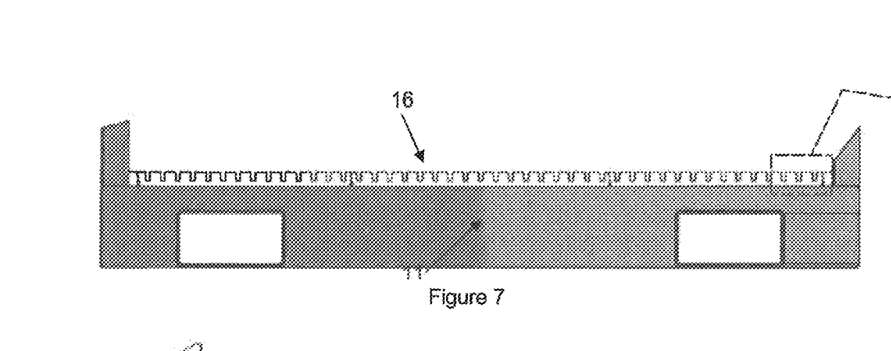
FIG. 7 is a detailed view of the portion identified in FIG. 2 as A-A.
Figure 8:
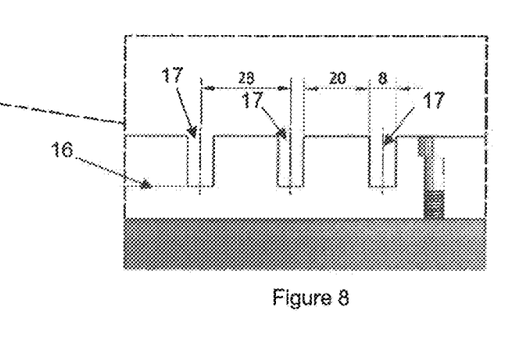
FIG. 8 is a further detailed view of the portion illustrated in FIG. 7.
Figure 9:
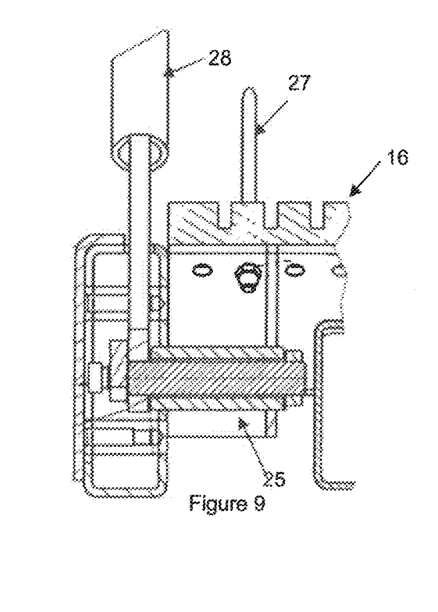
FIG. 9 is a sectional view along line D-D as illustrated in FIG. 2.
Figure 10:
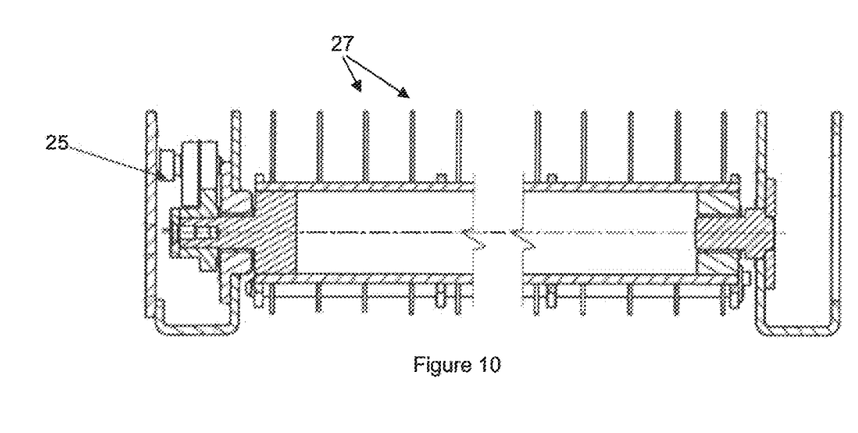
FIG. 10 is a sectional view along line E-E as illustrated in FIG. 2.
Figure 11:
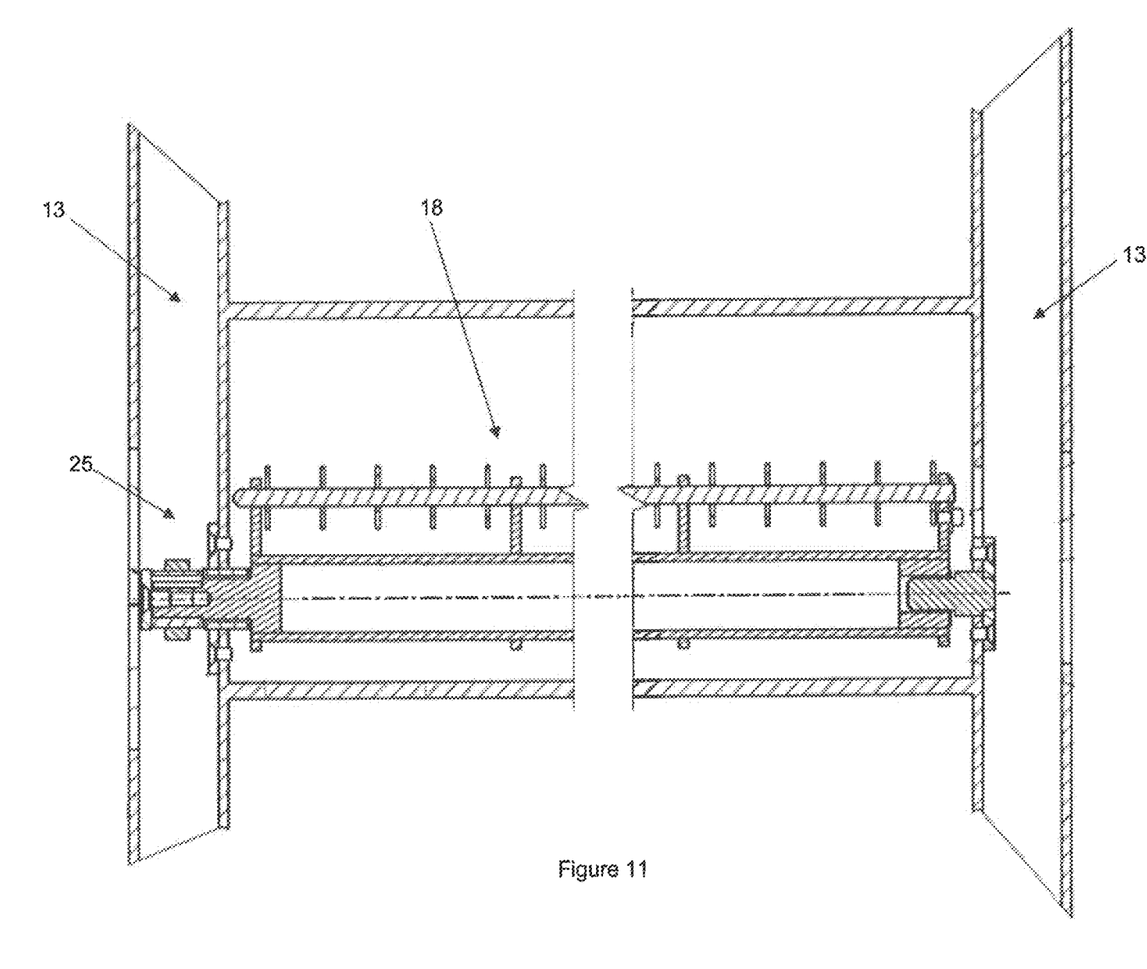
FIG. 11 is a sectional view along line F-F as illustrated in FIG. 2.
Figure 12:
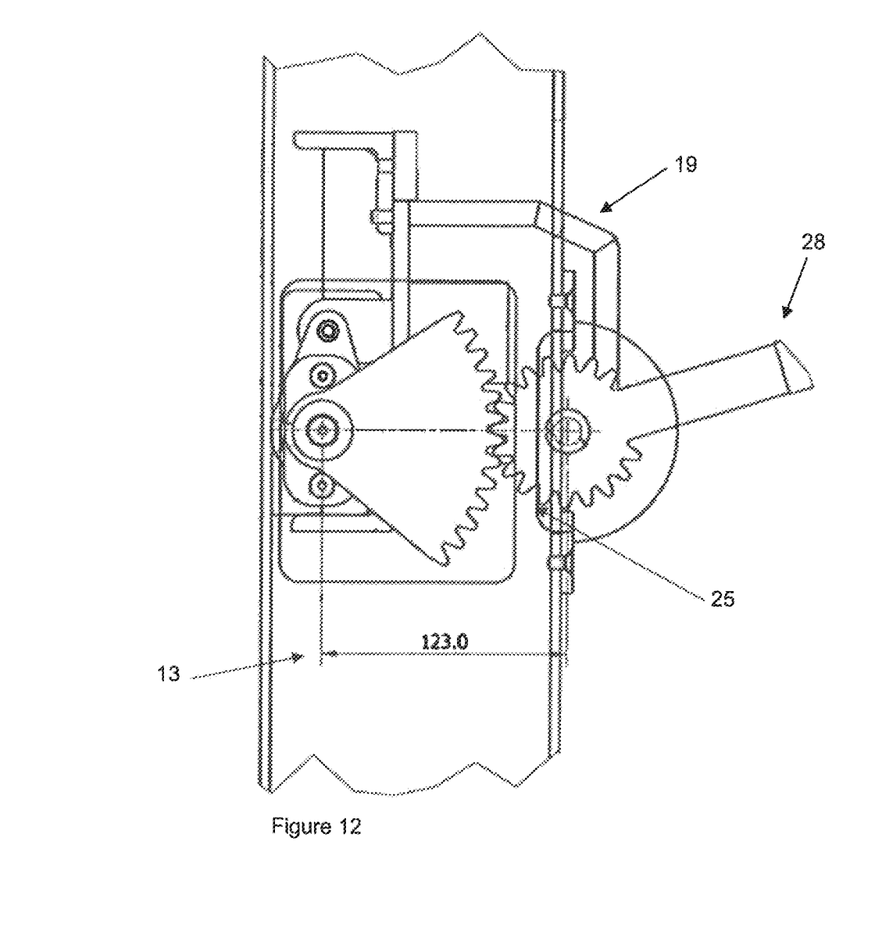
FIG. 12 is a detailed side view of view of the portion Identified in FIG. 1 as G.
Figure 13:
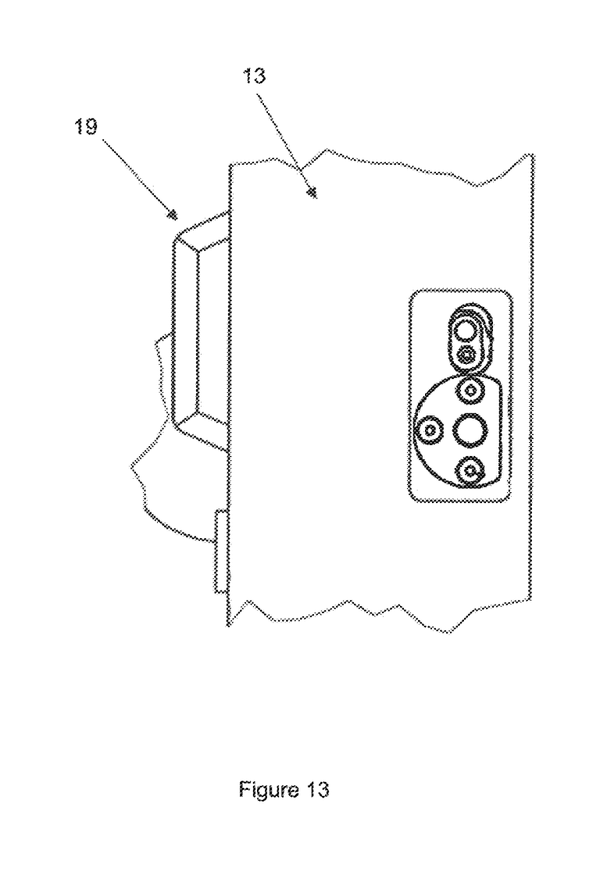
FIG. 13 is a detailed side view of the opposite end of the assembly Illustrated in FIG. 12.

In a particularly preferred embodiment, the floor member 16 is a unitary member with a number of elongate slots 17 formed thereinto with each elongate slot 17 configured to receive a lower edge of a panel in use. When viewed from the end as Illustrated in FIGS. 7 and 8, the floor member 16 shown has a square wave pattern with each of the slots 17 separated from an adjacent slot 17 by raised portion over its length. In a preferred configuration, the floor member 16 forms a part of a harp assembly in order to separate the panels and maintain the panels in a spaced apart configuration. Each panel tongue 19 is provided relative to a raised portion adjacent to an elongate slot 17 with the receiving gap 20 between respective panel tongues 19 being aligned with an elongate slot 17 in the floor member 16.

As Illustrated in FIG. 8 in particular, each slot 17 will be provided with a base wall and a pair of spaced apart, substantially parallel side walls. The base wall of each slot will typically abut an edge of a panel placed there into, typically over the length of the panel.

The upright members 13 may have any shape or configuration but preferably, will be substantially rectangular in cross-sectional shape. It is preferred that the upright members 13 are hollow in order to reduce weight. Typically, each of the upright members 13 is located outside the harp assembly or alternatively, the harp assembly is preferably provided within the perimeter defined by the base frame and the upright members 13.

The preferred frame of the present invention will normally be provided with one or more engagement assemblies to allow the harp rack 10 to be lifted using a lifting apparatus. The fully loaded harp rack may be quite heavy, particularly when loaded with a number of glass panels and a lifting apparatus may be required to move the harp rack 10. In a preferred configuration, a number of lifting rings 26 are provided attached to relative to the upper frame members to allow the harp rack 10 to be lifted using a crane or similar lifting equipment.

The harp system will preferably include a lower harp assembly provided relative to the base of the frame (which in the preferred configuration includes the floor member 16 with a number of elongate slots 17 formed thereinto) and a pair of other harp assemblies 18 to assist with maintaining the separation of the panels when loaded into the harp rack 10. In the illustrated preferred embodiment, a diagonally extending harp assembly and a secondary, vertical harp assembly are provided.

Figure 6:
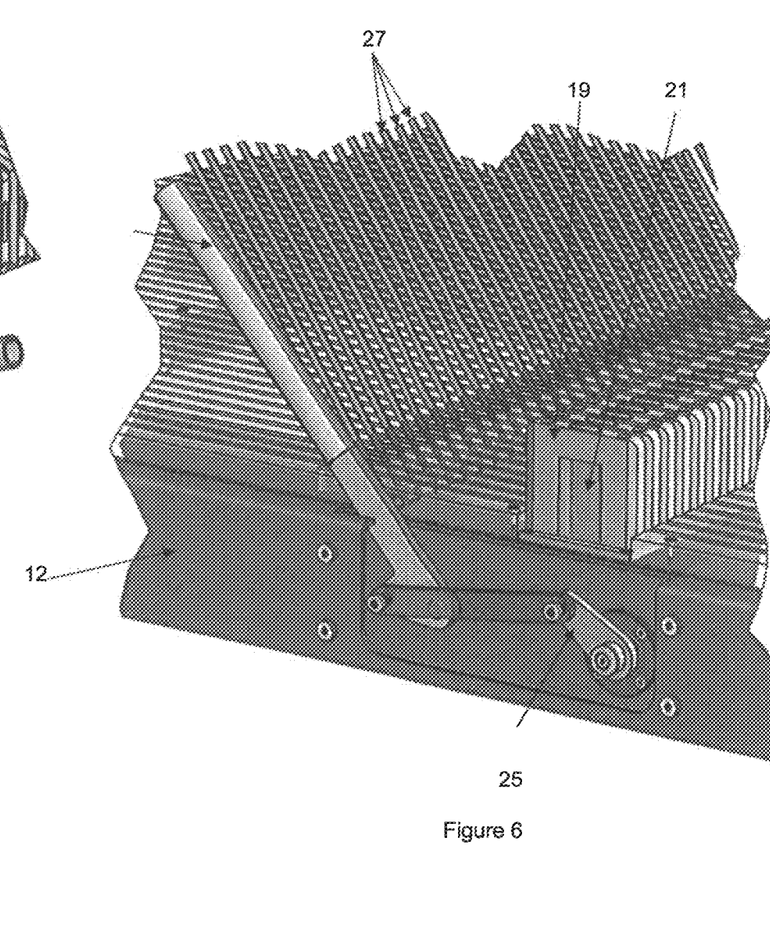
FIG. 6 is a detailed isometric view of the portion identified in FIG. 1 using reference letter C.

As illustrated, the diagonally extending harp assembly includes a series of spaced apart members 27, preferably wires or rods or the like. The spaced apart members 27 will normally be manufactured of metal but may be any material. As shown, the spaced apart members 27 are provided extending substantially parallel to one another but spaced apart to correspond to the width of the panels to be received therebetween. The spaced apart members 27 are typically mounted relative to the frame of the harp rack substantially coplanar with the raised portions between the elongate slots 17 provided in the floor member 16. As best seen in FIG. 6, a lower end of each of the elongate spaced apart members 27 is mounted relative to the raised portions between the elongate slots 17 provided in the floor member 16 and are spaced apart over the length, with an opposite end of each of the spaced apart members 27 being mounted relative to one of the upper members 14. Typically, a lower end of spaced apart members 27 is provided spaced from one end base member and the spaced apart members 27 extend at an angle upwardly from the floor member toward one of the upper end members 14.

As mentioned above, the elongate spaced apart members 27 of the diagonally extending harp assembly preferably extend from the floor member 16, between ⅓ to ½ of the length along the floor member 16 upwardly to the upper end frame member 14 at an opposite end of the harp rack 10. Preferably, an upper end of each of the elongate members is mounted relative to an inside edge of the upper end frame member.

A secondary vertical harp assembly is preferably provided relative to one end of the frame. The secondary harp assembly also includes a series of spaced apart members 27, preferably wires or rods or the like in a configuration corresponding to the diagonally extending harp assembly only vertically oriented. Typically, a lower end of spaced apart members 27 is provided above the end base frame member 11 and the spaced apart members 27 extend upwardly from the base assembly toward the upper end frame member 14 at the same end of the frame. The spaced apart members 27 of the diagonally extending harp assembly are preferably aligned with the spaced apart members 27 of the secondary harp assembly, the raised portions between the elongate slots 17 provided in the floor member 16 and the panel tongues 19 with a receiving gap for a panel located between each spaced apart pairs of these components.

The panels may be loaded into the lower harp assembly from any direction substantially parallel to the slot openings 17 and the elongate spaced apart members 27 of the harp assemblies.

As illustrated, two securing assemblies 18 are provided, one securing assembly provided relative to the base of the harp rack 10 and a second securing assembly provided relative to one end of the frame such that the securing assemblies will secure each of the panels at a lower edge and one of the end edges.

Typically, the second securing assembly will be oriented the inwardly towards the opposite end of the frame and in a preferred embodiment, is preferably mounted on a cross-member extending between the uprights provided at one end of the frame.

Each of the securing assemblies 18 of the illustrated embodiment has the same configuration but the actuator/drive mechanism 25 may be different for the different securing assemblies. Examples of the drive assemblies that are used in the illustrated embodiments are shown in FIGS. 5 to 13.

Each of the securing assemblies illustrated includes a plurality of panel tongues 19 spaced from one another by a respective receiving gap 20 configured to receive a portion of a panel therein. Each of the panel tongues 19 are substantially coplanar with the raised portions of the floor member 16 and/or the spaced apart members 27 of the harp assemblies.

Each panel tongue 19 is preferably generally rectangular in shape with a pair of parallel side faces, each defining a portion of the receiving gap 20 with an adjacent panel tongue 19. As shown in FIGS. 6 and 14, each of the parallel side faces is configured as an outer perimeter portion with a central opening 29. The opening 29 may be any shape however a rectangular opening is preferred. The central opening 29 will typically extend to the side face on both sides of the panel tongue 19.

Each panel tongue 19 includes a slot opening (obscured) which is located coaxial with the tongue 19 and approximately centrally across the width of the tongue 19, in communication with the central opening 29 and particularly, in communication with the opening 22 in the resilient block 21 provided in relation to each of the panel tongues 19.

In a particularly preferred configuration, each panel tongue 19 is provided with a resilient block 21 located at least partially within the central opening 29. Preferably, the resilient block 21 has the same width as the panel tongue 19 in the rest condition. The resilient block 21 is typically substantially rectangular in order to correspond to the shape of the central opening 29 although any shape could be used.

Each resilient block 21 includes a bore 22 into the resilient block 21 to allow the spigot 23 to move at least into the resilient block 21, to move the resilient block 21 into the expanded clamping condition. Typically, the bore 22 in the resilient block 21 is aligned with the slot or opening in the panel tongue 19.

The internal walk(s) of the bore 22 abut the shaped spigot 23 during movement of the shaped spigot 23 to force the resilient block 21 into the expanded clamping condition. In the rest condition, portions of the block 21 will typically be substantially coplanar with the side surfaces of the panel tongue 19 in order to define at least partially, the receiving gap 20.

When the resilient block 21 is moved into the expanded clamping condition, a portion of the resilient block 21 extends beyond the side face of the panel tongue 19 and into the receiving gap 20. Typically, the expansion of the resilient block 21 forced by the spigot 23 will be approximately even on both sides of each of the panel tongues 19.

The resilient block 21 may be formed of any material but will typically be formed of a foamed material. The material typically be chosen to minimise slippage with the surface of the panel in the panel is glass or similar but also to prevent or minimise any marking of the surface. The resilient block 21 will generally be made of a high friction material in order to securely grip the panels when the expanded clamping condition. The resilient block 21 will typically expand evenly and abut a portion of the panel in order to spread the load over a portion of the panel when in the expanded clamping condition.

The securing assemblies each include a shaped spigot 23 mounted relative to each of the panel tongues 19 and a drive mechanism 25 such that the drive mechanism can be utilised to selectively move the shaped spigot 23 relative to the resilient block 32 concurrently in all of the panel tongues 19 in a securing assembly in order to move the resilient blocks 21 in each of the panel tongues 19 into the expanded clamping condition. The movement of the drive mechanism in the opposite direction will typically move the shaped spigot 23 relative to the resilient block 21 to allow the resilient block 21 to resume the rest condition in which a panel can be inserted into the receiving gap 20 and removed from the receiving gap 20.

Although any shape may be utilised, it is preferred that the spigot 23 is tapered such that movement of the spigot 23 can be used to expand the resilient block 21 and retraction of the spigot 23 can be used to allow the resilient block 21 to resume the rest condition. Generally, the spigot 23 will be tapered in more than one direction. In the preferred embodiment illustrated, the spigot 23 is wedge shaped preferably having one or more angled or arcuate tapered surfaces.

Each spigot 23 will typically be associated with a mounting pin 24 or structure to mount each respective spigot 23 for movement relative to the resilient block 21 of a panel tongue 19. Generally, the mounting pin 24 or structure will be configured as a flattened tongue or pin which extends from an outer side of the spigot. Typically, the mounting pin or structure will be located relative to a respective frame member in order to be more easily accessible by a linking member to the drive mechanism 25.

During movement, the spigot 23 may be removed entirely from the or in the resilient block 21 but preferably, at least a portion of the spigot 23 may be located at least partially within the bore 22 in the resilient block 21 at all times and the spigot 23 simply moved relative to the bore 22 in the resilient block 21 to move the block 21 between the rest condition and the enlarged condition.

As mentioned above, movement of the spigot 23 relative to the bore 22 in the resilient block 21 moves the resilient block 21 from the rest condition where the block 21 or portions of the block 21 simply define a part of the receiving gap 20 between adjacent panel tongues 19 to an expanded condition in which at least a part of the resilient block 21 extends beyond the side face of the panel tongue 19 and into the receiving gap 20 to abut and hold a panel if located in the receiving gap 20. With a pair of panel tongues 19 defining a receiving gap 20 with a resilient block 21 in each, this will allow a panel located in the receiving gap 20 to be held on both sides.

A drive mechanism 25 is preferably provided to move the spigot 23 and typically all of the spigots 23 located in a particular securing assembly at the same time between the rest condition and the expanded condition. Typically, the drive mechanism 25 is a reciprocating drive which moves the spigots 23 from the rest condition to the expanded condition and then back to the rest condition.

Any drive mechanism may be used but it is preferred that the drive mechanism include a lever or handle 28, manual movement of which will cause movement of the spigots 23. Typically, the lever or handle 28 will be rotated by an operator in a first direction to move from the rest condition to the expanded condition and in an opposite direction to move from the expanded condition to the rest condition.

Any drive mechanism Including any lever 28 is preferably mounted relative to the harp rack such that movement of the lever or handle does not move the lever outside the periphery of the harp rack 10 (although the handle or lever may be located outside the frame of the harp rack).

As mentioned above, a plurality of spigots 23 in each securing assembly will typically be provided mounted relative to a single mounting drive bar or assembly to allow all of the spigots 23 to be moved concurrently.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is Included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the Invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A transportable harp rack for a plurality of panels, the harp rack including:
   a) a frame including:
      i) at least one base member; and,
      ii) at least a pair of spaced apart upright members extending at an angle relative to the at least one base member;
   b) at least two securing assemblies mounted on the frame, wherein a first securing assembly from said at least two securing assemblies is mounted on the at least one base member, and a second securing assembly from said at least two securing assemblies is mounted on a corresponding pair of spaced apart upright members from said at least a pair of spaced apart upright members, each securing assembly including:
      i) a plurality of panel tongues spaced from one another by a respective receiving gap configured to receive a portion of a corresponding panel therein;
      ii) at least one of the panel tongues provided with a resilient block therein, each resilient block including at least one opening therein; and
      iii) at least one shaped spigot mounted relative to a drive mechanism, wherein the drive mechanism selectively moves each shaped spigot relative to the at least one opening in each resilient block between a rest condition in which each panel can be inserted into or removed from each respective receiving gap and an expanded clamping condition in which each shaped spigot is inserted within the at least one opening of each resilient block which deforms and expands a thickness of each resilient block to clamp each respective panel within each respective receiving gap.

2. The transportable harp rack as claimed in claim 1, wherein the frame further includes:
   a base frame, wherein the at least one base member comprises four base members which together define a substantially rectangular perimeter that forms a rectangular opening; and,
   wherein the at least a pair of upright members comprises two pairs of spaced apart upright members, each upright member extending upward from a corner of the base frame.

3. The transportable harp rack as claimed in claim 2, further including a base assembly mounted on the base frame.

4. The transportable harp rack as claimed in claim 3, wherein the base assembly includes at least one floor member having a plurality of elongate slots formed therein, each elongate slot configured to receive a lower edge of each panel respectively.

5. The transportable harp rack as claimed in claim 4, wherein the elongate slots are separated from each other by raised portion.

6. The transportable harp rack as claimed in claim 5, wherein each panel tongue is provided relative to one of the raised portions adjacent to a corresponding elongate slot with each respective receiving gap aligned with each corresponding elongated slot in the base assembly respectively.

7. The transportable harp rack as claimed in claim 3, further including at least one harp assembly to separate the panels and maintain the panels in a spaced apart configuration.

8. The transportable harp rack as claimed in claim 7, wherein the at least one harp assembly includes:
   the base assembly, wherein the base assembly is a first ham assembly;
   a second harp assembly mounted to a first side of the frame.

9. The transportable harp rack as claimed in claim 8, wherein the at least one harp assembly further includes a third harp assembly.

10. The transportable harp rack as claimed in claim 8, wherein the the third ham assembly extends diagonally, and the second harp assembly extends vertically.

11. The transportable harp rack as claimed in claim 8, wherein the second harp assembly and the third harp assembly each include a series of spaced apart members.

12. The transportable harp rack as claimed in claim 1, wherein each panel tongue is generally rectangular in shape with a pair of parallel side faces, each defining a portion of a corresponding receiving gap.

13. The transportable harp rack as claimed in claim 12, wherein each panel tongue includes at least one central opening located.

14. The transportable harp rack as claimed in claim 13, wherein each panel tongue is provided with a corresponding resilient block located at least partially within each central opening.

15. The transportable harp rack as claimed claim 14,
   wherein a first movement of each drive mechanism moves the each shaped spigot relative to each resilient block to allow each resilient block to be in the expanded clamping condition in which each shaped spigot is inserted within each respective resilient block.

16. The transportable harp rack as claimed in claim 15, wherein a second movement of each drive mechanism moves the each shaped spigot relative to each resilient block to allow each resilient block to be in the rest condition in which each panel can be inserted into each respective receiving gap and removed from each receptive receiving gap.

17. The transportable harp rack as claimed in claim 15, wherein each spigot comprises a mounting pin.

18. The transportable harp rack as claimed in claim 1, further including one or more lifting rings to allow the harp rack to be lifted using a lifting apparatus.

* * * * *